United States Patent
Clough et al.

(10) Patent No.: US 6,434,617 B1
(45) Date of Patent: Aug. 13, 2002

(54) EXTENSIBLE, OBJECT-ORIENTED NETWORK INTERFACE

(75) Inventors: James Clough, Meridian; Craig R. White, Eagle, both of ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/255,046

(22) Filed: Feb. 22, 1999

(51) Int. Cl.[7] .................................. G06F 15/16
(52) U.S. Cl. ........................ 709/227; 709/230
(58) Field of Search ........................ 709/227, 228, 709/229, 232, 230; 703/26, 27

(56) References Cited

U.S. PATENT DOCUMENTS

| | | | | |
|---|---|---|---|---|
| 5,371,852 A | * | 12/1994 | Attanasio et al. ........... | 395/200 |
| 5,442,691 A | * | 8/1995 | Price et al. .................. | 379/220 |
| 5,485,460 A | * | 1/1996 | Schrier et al. ............... | 709/227 |
| 5,673,263 A | * | 9/1997 | Basso et al. ................ | 370/336 |
| 5,710,908 A | * | 1/1998 | Man ............................ | 395/500 |
| 5,721,876 A | * | 2/1998 | Yu et al. ...................... | 703/27 |
| 5,774,695 A | * | 6/1998 | Autrey et al. ................ | 703/26 |
| 5,999,979 A | * | 12/1999 | Vellanki et al. ............. | 709/232 |
| 6,005,864 A | * | 12/1999 | Krause ........................ | 370/395 |
| 6,131,121 A | * | 10/2000 | Mattaway et al. .......... | 709/227 |
| 6,253,248 B1 | * | 6/2001 | Nakai et al. ................ | 709/237 |

OTHER PUBLICATIONS

Kris Jamsa. "Internet Programming" Jamsa press 1995. ISBN 1–884133–12–6 pp. 154–219.*

* cited by examiner

Primary Examiner—Glenton B. Burgess
Assistant Examiner—Kenneth W. Fields

(57) ABSTRACT

The invention enables an application program to communicate a message over a network without having information regarding a protocol employed by the network. A network library program, running independently of the application program, stores communication protocol data and procedures for establishing message transport data structures to be used in communicating over the network. Initially, the application program passes an address string to the network library program. In response, the network library program determines a network protocol to be used by analyzing the received address string. The network library program then creates a "transport address" data structure which records both the protocol and the address string. The network library program further establishes a "transport" data structure for the specific message type to be dispatched, which data structure includes a dispatch command and a socket handle to be used during the transmission. Thereafter, the application program invokes the network library program to proceed with execution of the message dispatch action by using both the transport address data structure and the transport data structure.

10 Claims, 2 Drawing Sheets

EXTENSIBLE, OBJECT-ORIENTED NETWORK INTERFACE

FIELD OF THE INVENTION

This invention relates to application program interfaces which are used to access communication network functions and, more particularly, to an application program interface which isolates network function modifications from application programs.

BACKGROUND OF THE INVENTION

Interface programs that enable communications between application programs and network functionality have been constructed in such a way that information regarding network communication protocols was fed to the interface program by the application. This required each application to maintain an updated set of network protocols which could be provided to the interface program, in the event a particular network protocol was to be used.

For example, networks which employ the TCP/IP protocol require that the interface establish a "socket". A socket is a software construct which defines a repository or queue in a computer's operating system for data being transmitted/received, keeps track of various parameters of a communication session, the necessary protocol and command information for the session, etc. In the prior art, an application program requests the creation of a "socket" from a network library.

The network library provides communication functionality for various application programs. Initially, the application program informs the network library of the protocol that is to be utilized over the particular network. Further, the application program informs the network library of the address format and various other details of how the addresses are to be administered by the protocol. In response to a call for a socket, the network library creates a socket software construct and return its handle (i.e., its name) to the application. Thereafter, the application, in the event of a dispatch of a message, calls a "send" action from the network library and passes the name of the socket and the address to which the data is to be dispatched. The network library then executes the send command, utilizing the protocol and other information provided by the application. Once the message is dispatched, the application informs the network library to close the socket.

A principal difficulty with the above-indicated procedure is that the application program needs to maintain updated records of the most current protocols to enable communications to be successfully accomplished. However, these protocols are subject to change over time. Thus, each time a protocol is added, each application needs to be revised in order to reflect the most updated version.

The socket creation procedure works well with monolithic applications which employ non-extensible network libraries. Some piece of code in some part of an application will always know which protocol is being used or is to be used. In a monolithic application, all developed by a single team, it is reasonable to let such knowledge infiltrate other parts of the application. However, today it is common for different teams to work on different components that make up a software product, and for those components to be used in many applications.

Consider the case of a network transport library that is shared by several applications. When a new transport function is added, all of the affected applications must be updated to take advantage of the new functionality. Since each application must know about the different protocols, it is not possible for one team of developers to add a new protocol and have it immediately useful in all applications that use the transport component.

Accordingly, it is an object of this invention to provide an application/network interface which avoids the requirement of protocol information being supplied by applications attempting to communicate over the network.

It is another object of this invention to provide an improved network interface which, itself, includes sufficient information to enable application programs to communicate over the network without requiring that the application program have a predetermined level of protocol knowledge.

SUMMARY OF THE INVENTION

The invention enables an application program to communicate a message over a network without having information regarding a protocol employed by the network. A network library program, running independently of the application program, stores communication protocol data and procedures for establishing message transport data structures to be used in communicating over the network. Initially, the application program passes an address string to the network library program. In response, the network library program determines a network protocol to be used by analyzing the received address string. The network library program then creates a "transport address" data structure which records both the protocol and the address string. The network library program further establishes a "transport" data structure for the specific message type to be dispatched, which data structure includes a dispatch command and a socket handle to be used during the transmission. Thereafter, the application program invokes the network library program to proceed with execution of the message dispatch action by using both the transport address data structure and the transport data structure. Accordingly, only the network library program is required to maintain data regarding network protocols, and such data is invisible to the application program.

DETAILED DESCRIPTION OF THE INVENTION

Figure 1:
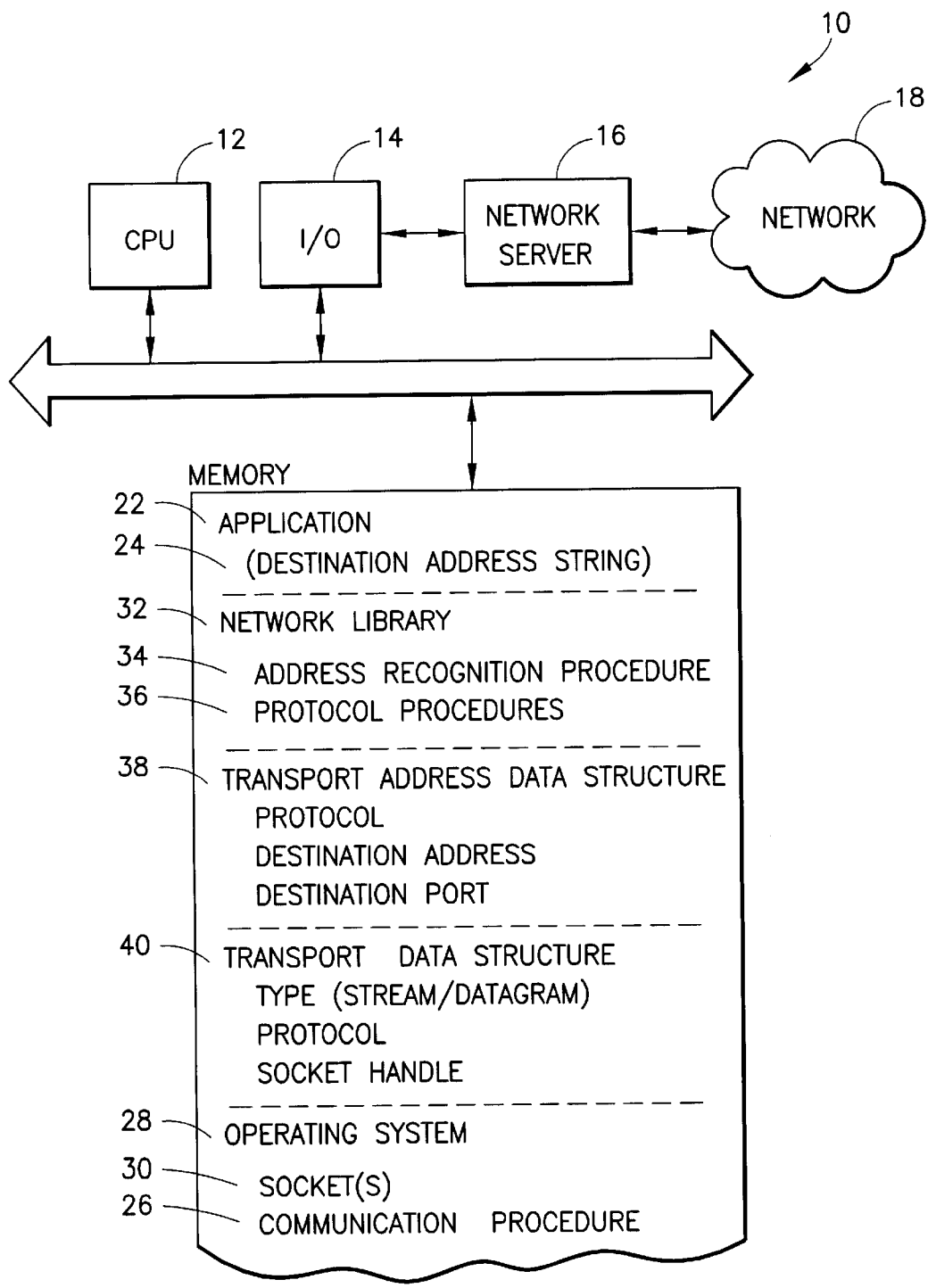
FIG. 1 is a block diagram of a system implementing the invention.

Referring now to FIG. 1, the invention implements an extended function network library as an interface between application programs and a communication procedure which provides interface functions with network elements. The network library includes all protocol information necessary to enable application programs to connect to and communicate with one or more accessible networks. In FIG. 1, a computer 10 is shown which includes a central processing unit (CPU) 12 and an input/output module 14. Input/output module 14 provides a communication interface with a network server 16 which, in turn, communicates over a network 18 and multiple entities connected thereto.

CPU 12 operates in conjunction with various programs and data stored in memory 20. It is to be understood that memory 20 may be a combination of random access memory and persistent memory such as is provided by a disk drive. Accordingly, within memory 20 are one or more applications 22, one of which includes a destination address string 24 designating an address of an element connected to network 18, to which a message is to be dispatched.

An independent program, i.e., network library 32, provides interface functions between application 22 and a communication procedure 26 that operates under functional control of operating system 28. Communication procedure 26 implements the prior art communication protocol actions (via I/O module 14) with network server 16 and creates one or more sockets 30. Accordingly, computer 10 is enabled to communicate with network server 16, utilizing the known protocol established therefor.

In the example to follow, it is assumed that network server 16 and network 18 operate utilizing the TCP/IP protocol. Network library 32 which forms the interface between application program 22 and communication procedure 26, operates independently from application program 22 and is replaceable as an independent software module. An address recognition procedure 34 is associated with network library 32 and is adapted to examine a destination address string and from the format of the string, determine the message protocol to which it is to be subjected. For instance, if the address string is: "15.62.42.17", the address string is an IP string and is subject to the IP protocol. Similarly if the address string is "foo.hp.com" it is also an IP string. By contrast, if the address string is: "abfffDG:bf080009EE92." it is an IPX string and is subject to the associated protocol. Finally, if the address string is: "0800096534ac", it is an Ethernet string and is subject to the associated protocol.

Network library 32 further is associated with one or more protocol procedures 36 and data structures that are required to enable a message to be configured for proper handling by network server 16 and network 18.

Two data structures are employed by network library 32 to enable dispatch of a message from an application 22 or receipt of a message by application 22. The first data structure is termed a "transport address" 38 which includes, in addition to the destination address of the message and a destination port to which the message is to be directed, a protocol to be used during dispatch of the message. A second data structure is termed simply a "transport" 40 and defines both the message type, the protocol to be used, and other protocol specific information, as needed.

With respect to message type, at least two message types are contemplated. The first is a "datagram" transport which enables dispatch or receipt of one packet at a time. The second message type is a "stream" transport which comprises a continuous stream of data packets and essentially enables the creation of a connection that allows a continuing series of messages to be dispatched or received (for instance, a print job). A stream transport is associated with one device and that device is persistently connected until the stream transport is closed. A datagram transport, once created, is device independent and is reusable, if the same protocol is to be utilized for a subsequent message.

Because network library 32 is a software module that runs independently from application 22, it can be replaced as a module, without requiring alterations to application 22. Further, it is only network library 32 which includes the protocol information required to enable communication with communication procedure 26 which, in turn, operates under control of operating system 28. Accordingly, protocol changes can be implemented by simply changing network library 32 and replacing it as a module without requiring any changes to either application 22 or operating system 28.

Figure 2:
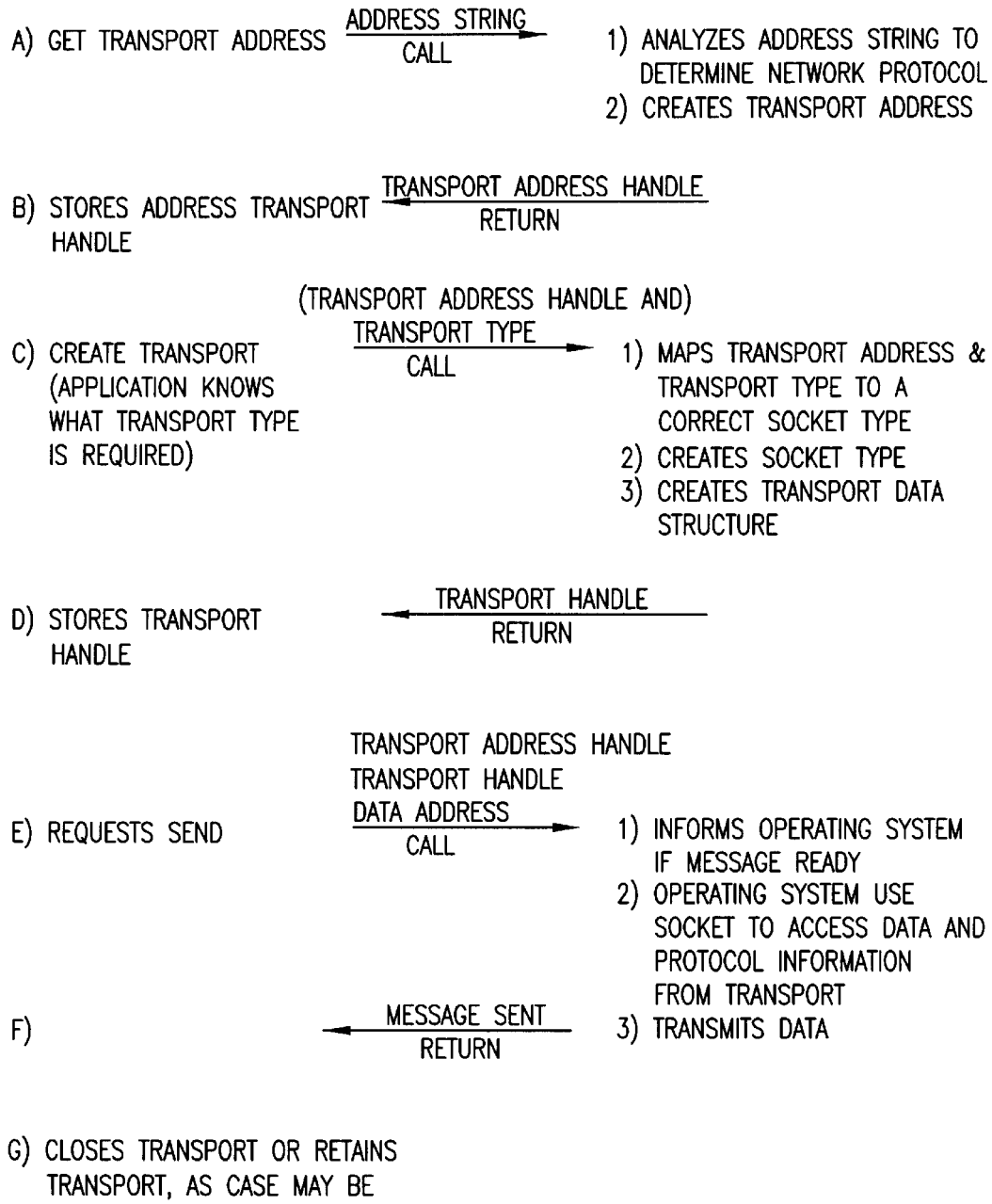
FIG. 2 is a data flow diagram illustrating the procedure of the invention.

Turning now to FIG. 2, the method of the invention will be described in conjunction with the diagram shown therein. It is to be understood that the example shown in FIG. 2 assumes that application 22 is ready to dispatch a message to network server 16 which, in turn, dispatches the message over network 18 to a recipient. However, it is to be understood that a similar procedure is followed if application 22 is readying its logical data structures for receipt of a message.

As shown in step A, application 22, being ready to dispatch a message, issues a request to obtain a "transport address". As part of the request, application 22 dispatches the address string which defines the address of the recipient of the message. Upon receiving the call for the transport address and the address string, network library 32 executes address recognition procedure 34 which analyzes the received address string. The result of the analysis enables an identification of the network protocol that is to be used to accomplish the message dispatch. Accordingly, network library 32 (step B) creates a transport address data structure 38 that includes a protocol identifier, a destination address, a destination port and other data that may be required to accomplish the transport action. The transport address data structure is stored in network library 32 and its "handle" (i.e., its name) is returned to application 22.

In step C, application 22 issues a call to network library 32 to create a "transport", and includes with the call, the handle of the transport address just received from network library 32. Additionally, application 22, knowing the type of data it is to transfer (i.e., a stream of packets or a single packet), designates a transport type to be used (i.e., either a datagram or a stream) and passes that transport type along with the transport address to network library 32.

In response, network library 32 maps the transport address and transport type to a correct socket type, and creates a socket 30 to accommodate the message type. Socket 30 is used to actually dispatch the message to network server 16. Further, network library 32 creates a transport structure which records the transport type, i.e., datagram or stream, the socket handle, the protocol and other information, as needed.

Once the above-noted actions are completed in response to the call for the transport, network library 32 returns the handle of the transport to application 22 (step D).

At this stage, application 22 is ready to dispatch the message. The dispatch action is commenced by (step E) passing to network library 32 a call for a send action, the call including the transport address handle and the transport handle. Application 22 further provides the address of the message data to network library 32 (e.g., the address where the message data can be accessed). In response, network library 32 informs operating system 28 of a message ready state.

Thereafter, communication procedure 26 is invoked and accesses, via socket 30, the data and protocol information from both the transport address 38 and transport 40 which have been previously created. The message is then dispatched in accordance with the acquired protocol information. An acknowledgment of the dispatch action is sent to application 22 (step F).

Application 22 (step G) then either closes the transport (i.e., if it is a stream transport), or maintains the transport in memory for use with a future address string requiring application of the same transport protocol. In essence, this eliminates the need to construct a further transport for use with a later datagram message.

Accordingly, as can be seen from the above description, the invention separates the creation of transport address and transport mechanisms from the application so as to disassociate the application from any knowledge of the network protocol and actions associated with the network protocol. Thus, changes to network protocols require only that the network library be altered and require no coding changes to applications which employ the network library.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for enabling an application program running on a computer to communicate a message over a network without having information regarding a protocol employed by said network, said computer also incorporating a network library program that independently runs on said computer, said network library program storing communication protocol data and procedures for establishing message transport data structures, said method comprising the steps of:

a) operating said application program to pass an address string to said network library program;

b) operating said network library program to determine a network protocol from said address string and to create a transport address data structure designating said protocol and address string;

c) further operating said network library program to establish a transport data structure for a specific message type to be dispatched by said application program, said transport data structure including information concerning a transport type to handle the message type, the protocol to be used and a communication data structure to be used with the network; and d) operating said application program to invoke said network library program to proceed with execution of a message dispatch action, using said transport address data structure, said transport data structure and said communication data structure.

2. The method as recited in claim 1, wherein step (c) causes said network library program to enable creation of said communication data structure in a form of a socket for use with said message dispatch action, and step (d) enables said socket to access data from said transport address data structure and said transport data structure to enable accomplishment of interface actions with said network.

3. The method as recited in claim 1 wherein step (b) determines said network protocol by analyzing contents of said address string received in step (a).

4. The method as recited in claim 1 wherein step (c) is responsive to a message type indication from said application program to cause said transport data structure to manifest said transport type.

5. The method as recited in claim 1, comprising the further step of:

e) upon completion of a message dispatch action, retaining said transport data structure for subsequent use with another message dispatch action.

6. A programming system for enabling a computer to accomplish communication of data over a network by an application program, said programming system comprising:

an operating system;

a network library including first means controllable by said operating system and responsive to a request from said application program accompanied by a destination address, to create a transport address data structure, said first means controlling said computer to: (i) analyze said destination address to identify a protocol to be used for a transmission action, from among a group of protocols maintained by said network library, (ii) construct said transport address data structure including said destination address and said data regarding said protocol, and (iii) return a transport address handle to said application program;

second means controlled by said operating system and responsive to a command from said application, accompanied by said transport address handle, for controlling said computer to: (i) create a transport data structure to receive said data, said transport data structure including determined protocol data and further (ii) create a socket data structure for dispatch of said message over said network and (iii) return a handle of said transport data structure to said application program;

third means responsive to receipt of said transport address data structure handle, transport data structure handle, data to be dispatched and a dispatch command, for employing data from said transport address data structure and transport data structure to enable dispatch by said computer of said message to a destination address.

7. The programming system as recited in claim 6, wherein said second means further causes creation of a socket for use with said message dispatch action, and said third means enables said socket to access data and to utilize data from said transport data structure to accomplish interface actions with said network.

8. The programming system as recited in claim 7 wherein said transport data structure further includes information concerning a transport type to handle the message type and a handle for said socket to enable said application program to identify said socket.

9. The programming system as recited in claim 6 wherein said first means determines said network protocol by analyzing contents of said address string.

10. The programming system as recited in claim 6, further comprising:

fourth means operative, upon completion of a message dispatch action, for retaining said transport data structure for subsequent use with another message dispatch action.

* * * * *